Dec. 20, 1966  H. ORTHEY  3,292,468
METHOD OF AND MACHINE FOR CUTTING TUBULAR STOCK
Filed Oct. 13, 1964  2 Sheets-Sheet 1

HUBERT ORTHEY
INVENTOR.

BY Mestern, Ross & Mestern

Dec. 20, 1966    H. ORTHEY    3,292,468
METHOD OF AND MACHINE FOR CUTTING TUBULAR STOCK
Filed Oct. 13, 1964    2 Sheets-Sheet 2
FIG.3
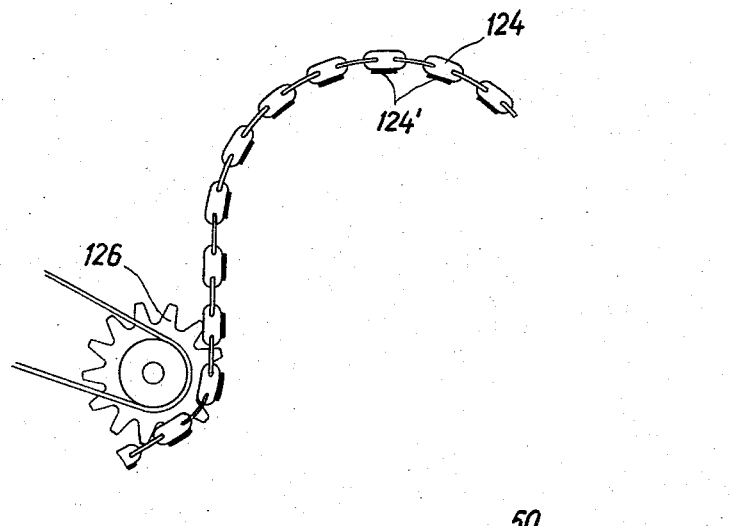
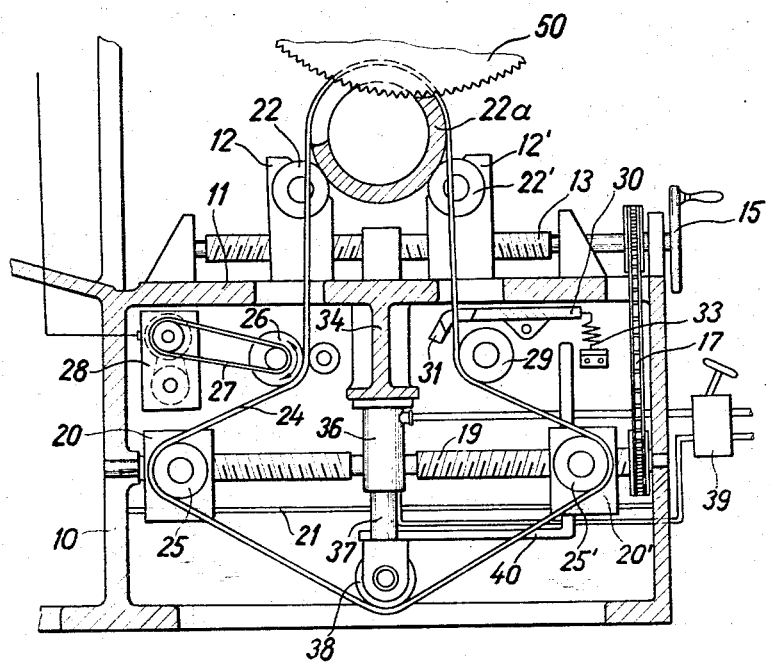
FIG. 2
HUBERT ORTHEY
INVENTOR.
BY Mestern, Ross & Mestern

United States Patent Office 3,292,468
Patented Dec. 20, 1966

3,292,468
METHOD OF AND MACHINE FOR CUTTING
TUBULAR STOCK
Hubert Orthey, Wetzlar (Lahn), Germany, assignor to
Buderus'sche Eisenwerke Wetzlar, Wetzlar, Germany,
a corporation of Germany
Filed Oct. 13, 1964, Ser. No. 403,493
Claims priority, appplication Germany, Oct. 16, 1963,
B 73,897
12 Claims. (Cl. 82—101)

My present invention relates to a method of cutting tubular stock with the aid of a rotary severing blade and to a machine for carrying out the method.

The depth of stock to be cut in conventional manner by a rotary blade is limited, in general, to a value somewhat less than the effective width of the blade, i.e. the difference between its own radius and that of its supporting hub, if the operation is to be performed in a single step and without repeated remounting of the stock, such remounting usually resulting in uneven cuts apart from greatly increasing the operating time and cost per cut. The radius of the blade, on the other hand, is limited by considerations of maximum permissible peripheral speed, heat dissipation, mechanical stresses and space requirements.

It is, therefore, the general object of this invention to provide a method of and a machine for cutting tubular stock of a large range of diameters, including rough-surfaced workpieces, in a single operation resulting in an even and smooth cut.

A more specific object of my invention is to provide means in such machine for stably supporting stock of various sizes for a cutting operation.

A feature of my invention resides in the provision of a method of cutting tubular stock with the aid of a circular blade having a radius and therefore an effective width substantially less than the diameter of the stock (but larger than its wall thickness), this method involving the placing of the stock for rotation about an axis parallel to the blade axis and, after the blade has been brought into cutting engagement with a limited arcuate segment of the stock, rotating the stock about its axis at a slow speed relative to that of the blade while continuing the cutting operation with substantially constant depth of penetration until the blade has cut through the entire circumference of the stock.

In order to carry out the above method, I provide at least one pair of transversely (i.e., for convenience, horizontally) spaced supporting rollers for a workpiece to be cut, in combination with an endless flexible member such as a belt or a chain which is disposed adjacent these rollers for looping about the workpiece so as to press the same onto the supporting rollers while the blade does its work; this flexible member is entrained by a source of motive power, such as a driven friction roller or sprocket in engagement therewith, whereby the workpiece is rotated about its own axis. The combination of supporting rollers and flexible band under tension securely retains the workpiece in an axially fixed position so that the stock will not shift longitudinally while being worked on and the blade will not be subjected to transverse strains as would be the case with a freely supported workpiece of not exactly circular periphery.

In order to bring about the necessary tightening of the band around the workpiece, another feature of my invention calls for the provision of an outwardly movable tensioning roller bearing upon the band from within, this roller being advantageously carried on a hydraulically or pneumatically operable arm movable in a vertical axial plane of the workpiece so as to pass between the two supporting rollers and also between a pair of band-guiding rollers (preferably idlers) symmetrically disposed beneath the supporting rollers on opposite sides of that plane. Two additional rollers, one forming part of the drive and the other constituting an element of a brake for the band, may also be disposed substantially symmetrically adjacent the band, between the levels of the supporting rollers and the guide rollers, for engagement with the outer band surface; the brake roller, normally operating merely as an idler, co-operates with a clamping element inside the band and is linked with the operating arm for the tensioning roller in such manner as to be urged against the band and its brake roller upon a slackening of the band by the withdrawal of the tensioning roller from its tightening position.

The above and other objects, features and advantages of my invention will become more fully apparent from the following detailed description, reference being made to the accompanying drawing in which:

FIG. 2 is a view similar to the lower part of FIG. 1, showing the machine adjusted for operation on a workpiece of small diameter; and FIG. 3 is a detail view of a modified band for the machine.

Figure 1:
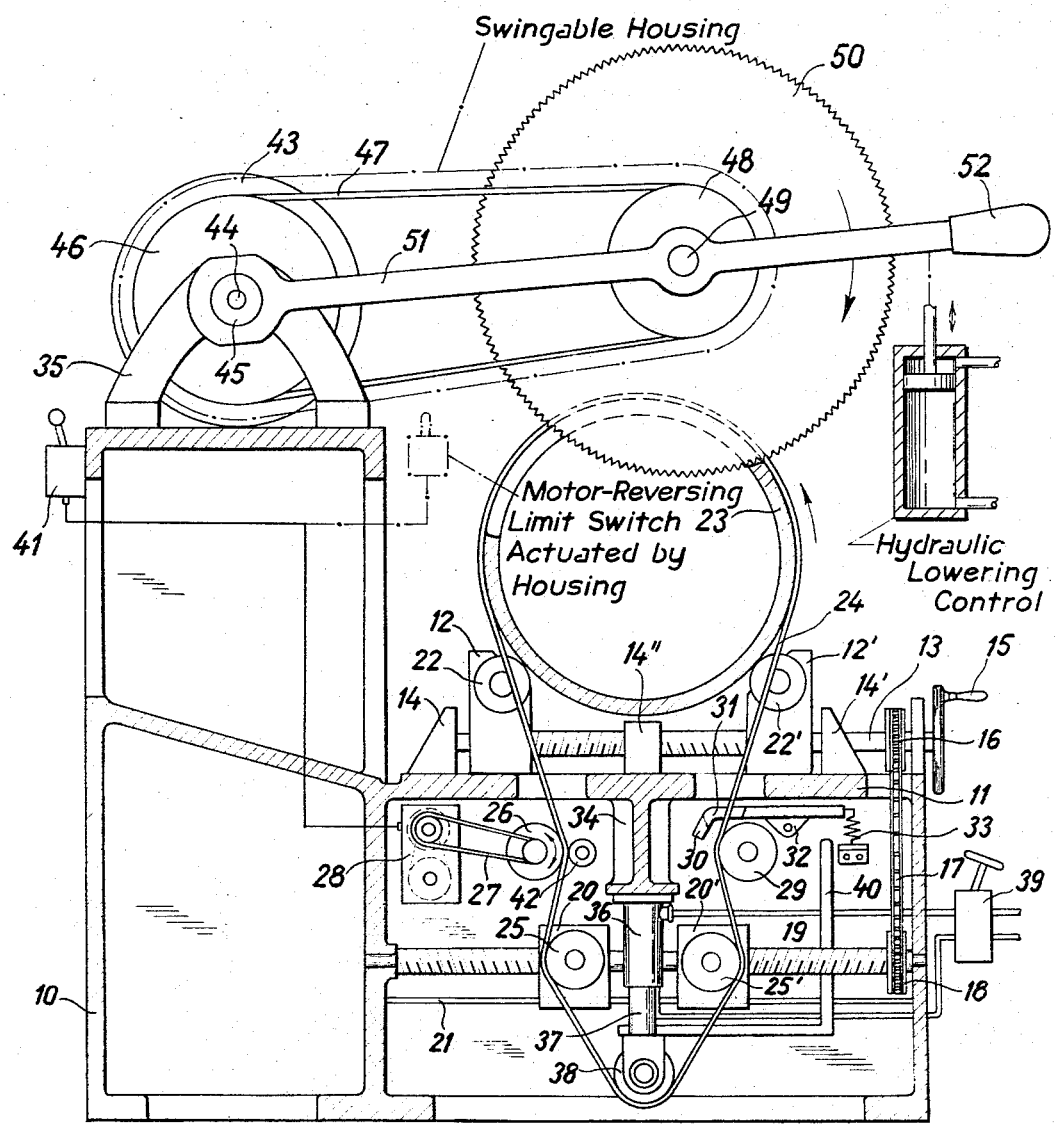
FIG. 1 is a sectional elevational view of a machine embodying the invention, shown in the process of operating on a workpiece of large diameter.

The machine illustrated in FIGS. 1 and 2 comprises a frame 10 forming a slotted platform 11 on which a pair of roller mounts 12, 12' are horizontally slidable. A leadscrew 13, journaled in bearing 14, 14', 14" on platform 11, has threads of opposite pitch in engagement with the roller mounts 12 and 12'. A crank 15 is fastened to the leadscrew 13 which also carries a sprocket 16 linked via a chain 17 with another sprocket 18 on a second leadscrew 19; the latter is journaled in the frame 10 below leadscrew 13 and carries a pair of roller mounts 20, 20' traversed by a rod 21 which holds them against rotation about the leadscrew axis.

The mounts 12, 12' carry a pair of freely rotatable rollers 22, 22' which are suitably elongated, and/or supplemented by other roller pairs aligned therewith, to support a workpiece 23 of tubular stock. The workpiece is embraced by an endless belt 24 which passes just in front of the rollers 12, 12' and is looped around a pair of idler rollers 25, 25' carried on mounts 20 and 20'. A friction roller 26, driven via a belt 27 from a reversible motor 28, and another idler roller 29 are journaled in side walls of frame 10 between the levels of rollers 12, 12' and 25, 25' for symmetrical engagement with the outer surface of belt 24; roller 29 is overlain by a plate-shaped brake element 30 which has a slot 31 for the passage of the belt and is pivoted on the frame 10 at 32 for clamping engagement with the belt 24 from which its tip is normally held separated by a spring 33.

Depending from platform 11 is a boss 34 carrying a hydraulic cylinder 36 whose piston 37 constitutes a vertically movable supporting arm for a freely rotatable tensioning roller 38 bearing from within upon the belt 24.

A valve 39 controls the admission of hydraulic fluid from a pump or other high-pressure source, not shown, to the cylinder 36 for selectively lowering or raising the roller 38 to tighten or slacken the belt 24. A pusher 40 rigid with piston 37 trips the plate 30 upon the raising of roller 38 to clamp the belt 24 between this plate and the roller 32, thereby arresting the movement of the belt and of the workpiece 23 rotatively entrained by it. Motor 28 is controlled by a switch 41 by which it may be energized for rotation in either direction; thus, if motor 28 normally operates to turn the workpiece 23 counterclockwise, as indicated, its reversal upon actuation of the brake 30, 32 will foreshorten the lower loop of the belt 24 around the withdrawn roller 38 and will therefore lengthen its upper loop around workpiece 23 to facilitate the removal of the engaged workpiece portion or its shifting within the loop preparatorily to another cutting operation. The motor roller 26 is, for this purpose, juxtaposed with a counterroller 42 engaging the belt 24 from within. Switch 41 serves, if desired, also for the de-energization of motor 28 during periods of standstill or when the machine is to be readjusted to receive stock of different diameter, such as a workpiece 23a shown in FIG. 2.

Supported on the frame 10 is a drive motor 43 whose shaft 44, journaled in bearings 45 on brackets 35 (only one shown), carries a pulley 46 linked via a belt 47 with a pulley 48 on a blade shaft 49. The latter shaft carries a circular saw blade 50 and is supported in a yoke 51 whose ends are swingable about the bearings 45 and which terminates in a handle 52 for raising and lowering the blade 50 with reference to the stock 23 or 23a. The blade 50 and its mountings may be surrounded by a suitable guard, not shown, for safety purposes.

In operation, motors 43 and 28 are energized to rotate the blade 50 at high speed and the belt 24 at considerably lower speed, in a direction opposite that of the blade, as indicated by the arrows in FIG. 1. Handle 52 is lowered only sufficiently to let the blade 50 penetrate a peripheral segment of the workpiece, at a location just ahead of belt 24, whereby an unsupported forward portion of the workpiece is sliced off as soon as the workpiece has rotated about its axis to an extent, less than a full turn, determined by the depth of penetration. This depth may be controlled manually or in any other manner not further illustrated. Similarly, the operation of valve 39 and switch 41 to retract the roller 38 and to reverse the roller 26 could be performed automatically and concurrently, e.g. after a predetermined advance of the band 24.

A comparison between FIGS. 1 and 2 shows that the spacing of the rollers 12, 12' has been reduced whereas that of the rollers 25, 25' has been commensurately increased upon a replacement of the large-diameter workpiece 23 by the small-diameter workpiece 23a, the tensioning roller 38 occuping substantially the same bottom position in each case; this is due to a suitable dimensioning of the threads of leadscrews 13 and 19 interlinked by the chain transmission 16–18.

The endless band encircling the workpiece need not be a belt 24 but could also be some other flexible member, such as a chain 124 partly illustrated in FIG. 3. In this case the roller 126 of the band drive is provided with chain-engaging sprocket teeth, as shown. The chain, if of metal, advantageously is provided with inner layers 124' of rubber or high-friction plastic material to increase its grip upon the engaged workpiece. Similar patches of increased frictional contact could, of course, also be provided on the belt 24 of FIGS. 1 and 2 if the same is designed as a metallic element, e.g. a steel band.

The machine shown and described has been found capable of smoothly cutting stock of various materials, including thick-walled concrete pipe, ranging widely in diameter.

Naturally, the system herein disclosed admits of many modifications without departing from the spirit and scope of my invention as defined in the appended claims. Thus, for example, two pairs of aligned supporting rollers 12, 12', mounted on common or positively coupled supports, could be disposed forwardly and rearwardly of the blade 50 and the belt 24 (or the chain 124) if tubes of great length are to be cut at points remote from both ends.

I claim:

1. A machine for cutting tubular stock, comprising at least one pair of transversely spaced supporting rollers for a workpiece to be cut, a rotatable cutting blade above said rollers, movable mounting means for said blade enabling its displacement toward said rollers, an endless flexible member disposed adjacent said rollers for looping about said workpiece, adjustable guide means for said member below said rollers, tensioning means for tightening said member about the workpiece, and drive means for imparting motion to said member in its tightened state.

2. A machine as defined in claim 1 wherein said guide means includes a pair of horizontally spaced idler rollers with adjustable separation.

3. A machine as defined in claim 1, further comprising switch means for reversing the direction of operation of said drive means.

4. A machine as defined in claim 1, further comprising brake means for arresting said member upon deactivation of said drive means.

5. A machine as defined in claim 1, further comprising adjusting means for varying the relative spacing of said supporting rollers.

6. A machine for cutting tubular stock, comprising at least one pair of transversely spaced supporting rollers with adjustable separation for a workpiece to be cut, a rotatable cutting blade above said rollers, movable mounting means for said blade enabling its displacement toward said rollers, an endless flexible member disposed adjacent said rollers for looping about said workpiece, at least one adjustable guide roller for said member below said rollers, a tensioning roller provided with a fluid-presure-operable supporting arm for tightening said member about the workpiece, drive means for imparting motion to said member in its tightened state, and adjusting means for the setting of said guide and supporting rollers.

7. A machine as defined in claim 6, further comprising brake means coupled with said arm for arresting said member in its slackened state upon a withdrawal of said tensioning roller, said drive means including a friction roller positioned to bear upon the tightened member.

8. A machine as defined in claim 7 wherein said brake means includes an idler roller in engagement with said member and an element movable to clamp said member between itself and said idler roller.

9. A machine for cutting tubular stock of different diameters, comprising a pair of horizontally spaced supporting rollers for a workpiece to be cut, a rotatable cutting blade above said rollers, movable mounting means for said blade enabling its displacement toward said rollers, an endless flexible band disposed adjacent said rollers for looping about said workpiece, a pair of horizontally spaced guide rollers embraced by said band underneath said supporting rollers, tensioning means for tightening said band about the workpiece and said guide rollers, first and second adjustable mounting means for varying the mutual separation of said supporting rollers and said guide rollers, respectively, operating means for jointly adjusting said first and second mounting means in mutually opposite senses whereby a change in the separation to accommodate a workpiece of different diameter is compensated by an inverse change in the separation of said guide rollers, and drive means for imparting motion to said band in its tightened state.

10. A machine as defined in claim 9 wherein said drive means includes a driven roller engaging said band at a location between the levels of said supporting and guide rollers, further comprising an idler roller engaging said band at the level of said driven roller and at a location substantially symmetrical thereto.

11. A machine as defined in claim 10, further comprising brake means including said idler roller for arresting said band and a linkage between said tensioning means and said brake means for rendering the latter effective upon a slackening of said band by the deactivation of said tensioning means.

12. A machine as defined in claim 11 wherein said tightening means includes a further roller embraced by said band and a support for said further roller movable substantially in a vertical axial plane of the workpiece symmetrically disposed with reference to said guide and supporting rollers.

No references cited.

WILLIAM W. DYER, Jr., *Primary Examiner.*

HARRISON L. HINSON, *Examiner.*